United States Patent

[11] 3,623,094

[72] Inventors T. O. Paine
Acting Administrator of the National Aeronautics and Space Administration in respect to an invention of;
Joseph P. Grabowski, Willingboro; Walter E. Powell, Jr., Cinnaminson, N.J.
[21] Appl. No. 802,812
[22] Filed Feb. 27, 1969
[45] Patented Nov. 23, 1971

[54] TARGET ACQUISITION ANTENNA
8 Claims, 4 Drawing Figs.
[52] U.S. Cl. .................................................. 343/7.4,
343/16 M, 343/779, 343/786
[51] Int. Cl. ....................................................... G01s 9/22,
H01q 13/02
[50] Field of Search ........................................... 343/7.4, 16
SD, 16 LS, 776, 779, 786

[56] References Cited
UNITED STATES PATENTS
2,418,156 4/1947 Bollman ....................... 343/16 LS
2,942,258 6/1960 Priest ........................... 343/7.4 X
3,164,835 1/1965 Alsberg ........................ 343/779
3,243,805 3/1966 Smith, Jr. ..................... 343/7.4

Primary Examiner—Malcolm F. Hubler
Attorneys—R. F. Kempf, E. Levy and G. T. McCoy ABSTRACT: A target tracking and acquisition system includes a Cassegrain reflector system driven by three horn feed elements. One horn excites a main lobe coincident with the reflector system boresight axis while the other horns excite main lobes at off axis angles above and below the boresight axis. Relatively high amplitude crossovers exist between the three main lobes. The feed producing the main lobe coincident with the boresight axis lies at a focal point of the reflector system, while the feeds which excite the other two main lobes are removed from the boresight, elevation and azimuth axes of the reflector system. The feed elements are driven through a frequency multiplexer, having a plurality of cascaded channels. Each of the channels, except one, includes a pair of hybrids, between which are connected a pair of high pass filters.

INVENTORS,
JOSEPH P. GRABOWSKI
WALTER E. POWELL
ATTORNEYS 3,623,094

INVENTORS,
JOSEPH P. GRABOWSKI
WALTER E. POWELL

BY
Carl Levy
ATTORNEYS ial number (72 Stat. 435; 42 U.S.C. 2457).

TARGET ACQUISITION ANTENNA

The invention described herein was made in the performance of work under a NASA contract and is subject to the provisions of Section 305 of the National Aeronautics and Space Act of 1958, Public Law 85-568 (72 Stat. 435; 42 U.S.C. 2457).

The present invention relates generally to antennas and, more particularly, to an antenna feed exciting a reflector system to derive a plurality of substantially equal amplitude secondary main lobes, one being aligned with the reflector boresight axis and the others being angularly displaced on either side of the boresight axis and having large amplitude crossovers with the lobe aligned with the boresight axis.

Target tracking systems utilizing radar techniques have been extensively developed. One of the radar target tracking systems which has found considerable favor in locating objects in outer space has utilized the so-called monopulse or simultaneous lobing technique. In some monopulse systems, four mutually orthogonal feeds derive elevation and azimuth radiation patterns having relatively deep nulls aligned with the antenna system boresight axis. In response to a tracked target being located at a position displaced from the antenna system boresight axis, a null in at least one of the patterns is not detected and the energy in the pattern indicates in the pattern plane the target angle relative to the boresight axis.

Because of the inherent properties of the monopulse radiation patterns monopulse tracking systems generally have poor acquisition properties. In particular, the tracking lobes in the elevation and azimuth planes are relatively narrow and to not usually extend for more than one beam width, which in one typical embodiment is about 0.75°, on either side of the boresight axis. Hence, with most existing monopulse systems, if a target is removed from the boresight axis by more than one beam width in the elevation or azimuth planes, no indication of the presence of a target is provided. If the presence of a target, without an indication of location, is desired for acquisition purposes, some auxiliary means, which may not be compatible with the monopulse feed, must be provided.

In accordance with the present invention, there is provided a target acquisition system compatible with a monopulse tracking system, whereby the acquisition and tracking functions are accomplished with the same feed and reflector system. The system includes a pair of auxiliary feeds, as well as the centrally located monopulse feed, for exciting the reflector system. The maximum amplitudes of the radiation patterns resulting from excitation of the auxiliary feeds are substantially the same and equal to the so-called sum lobe of the monopulse feed elements being excited in phase. The auxiliary lobes are derived at elevation angles above and below the boresight axis along which the sum lobe lies. The auxiliary lobes have crossovers with the sum lobe at the same amplitude as the amplitude of the auxiliary lobes at the greatest angle from the boresight axis desired to be tracked. Thereby, a composite pattern having three main lobes, each of which has approximately the same amplitude, is provided. The crossover amplitudes of the two side lobes with the center lobe is sufficiently large whereby nulls do not occur in the composite pattern throughout the angle for which acquisition is desired.

The most obvious approach for deriving the composite pattern, having three main lobes as stated, might appear to involve aligning a pair of auxiliary feeds with the monopulse feed in the reflector system elevation plane. It has been found, however, that this apparently obvious approach to the problem does not produce the desired results. In particular, an efficiently operating antenna feed and reflector system, for target acquisition purposes, preferably employs relatively large diameter feed horns. Large diameter horns are desirably utilized to minimize energy spillover past a reflector since they provide a narrower beam width than small diameter horns. If an appreciable amount of radiation spillover, i.e., radiation from the feed which is directed outside the confines of the reflector, occurs, secondary beams having sufficiently large amplitudes for long range acquisition cannot be derived with existing transmitters because of power limitations. Hence, in target acquisition systems, wherein the largest possible amplitude pattern is desired to enable the presence of a target to be detected for long range applications, it is important to employ feed horns having relatively large diameters.

While large diameter feed horns are desired, it is also necessary to minimize the separation of the horn centers in the elevation plane to provide a composite pattern having a relatively constant high amplitude throughout the acquisition angle. If there is an appreciable separation between the centers of the horns, the pattern resulting from each horn has a longitudinal axis displaced by a substantial angle relative to the pattern derived from an adjacent horn. An appreciable separation between the longitudinal axis of adjacent patterns or lobes results in low amplitude crossovers between those patterns to produce nulls and obviate the ability to acquire or detect the presence of a target throughout the angular region of interest.

In accordance with the present invention, the tracking and acquisition functions are combined in a single feed and reflector system by employing large, equal diameter horns as the feed elements exciting the auxiliary and tracking lobes, whereby spillover is minimized. The separations of the horn centers in the elevation plane are optimized to provide the desired high crossover amplitudes by offsetting the auxiliary feed horns from the boresight, elevation and azimuth axes of the antenna reflector system. The apertures of the offset auxiliary horns are symmetrically located about the elevation axis, on one side of the azimuth axis and have their apertures directed toward an apex of the reflector system. The pointing angle of the auxiliary horns relative to the reflector system apex is such that the reflector is relatively uniformly illuminated over its entire area by both of the auxiliary feeds.

While the principles of the present invention are applicable to any type of reflector system producing a secondary radiation pattern, they are most advantageously utilized in conjunction with Cassegrain reflecting antenna systems. In a Cassegrain system, the tracking and auxiliary feeds are positioned in proximity to the apex of a paraboloid main reflector and are located approximately at the focal point of a hyperboloid subreflector. The tracking feed is located at one of the hyperboloid focal points, while the auxiliary reflectors are slightly removed from the hyperboloid focal point. The diameters and pointing angles of the feeds are such that the subreflector is uniformly illuminated by each feed and a minimum amount of spillover occurs. Of course, the utilization of a Cassegrain reflecting system has the advantage of enabling the feeds and circuitry associated therewith to be located at a relatively accessible position, rather than at the focal point of a paraboloid reflector.

In accordance with another aspect of the present invention, an indication of the gross position of the target being acquired is derived by frequency and time multiplexing the feeds producing the three, main beams comprising the composite pattern. By frequency and time multiplexing the three beams, it is possible to determine in which of these beams the target is located, and thereby provide a coarse indication of target angular position.

It is, accordingly, an object of the present invention to provide a new and improved target acquisition system capable of functioning directly with target tracking antenna systems.

Another object of the present invention is to provide a target acquisition system which is adapted to be utilized in conjunction with existing target tracking antenna systems, with a minimum modification of existing antenna reflector and feed systems.

A further object of the present invention is to provide a target acquisition system for deriving a plurality of relatively large amplitude lobes having high crossover amplitudes.

Another object of the present invention is to provide a target acquisition system utilizing feeds in combination with reflectors wherein the feeds are relatively large diameter horns displaced from each other in such a manner as to produce a composite pattern including a plurality of relatively equal amplitude main lobes having their crossovers.

Still another object of the invention is to provide a new and improved target acquisition system particularly adapted to be utilized in conjunction with Cassegrain reflector systems for deriving a plurality of relatively equal amplitude, main lobes having relatively large crossover amplitudes and wherein the Cassegrain subreflector is efficiently illuminated by employing relatively large diameter horns as the feed elements.

The above and still further objects, features and advantages of the present invention will become apparent upon consideration of the following detailed description of one specific embodiment thereof, especially when taken in conjunction with the accompanying drawings, wherein.

Figure 1:
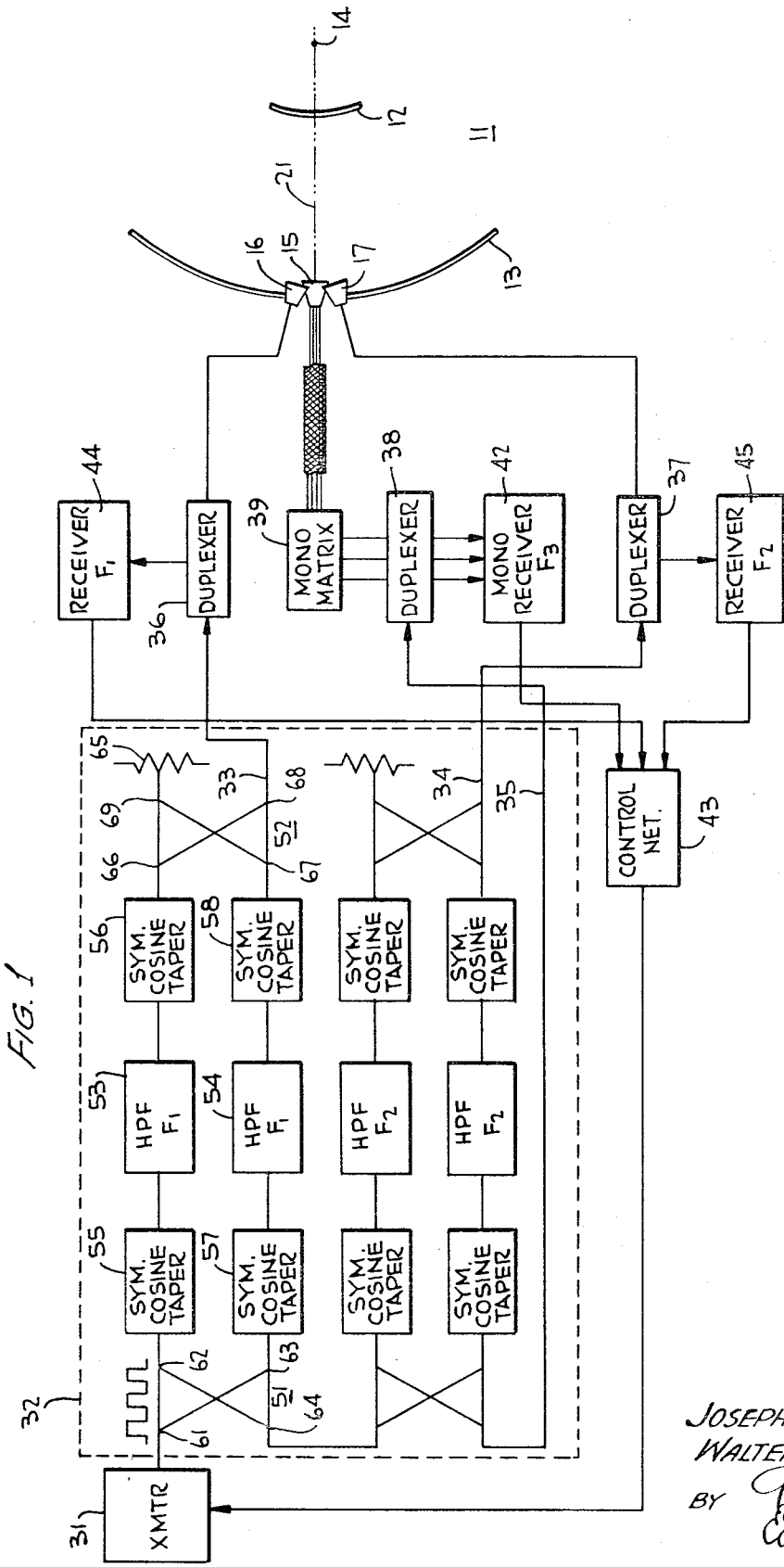
FIG. 1 is a block diagram of a system and antenna feed in accordance with the present invention.
Figure 2:
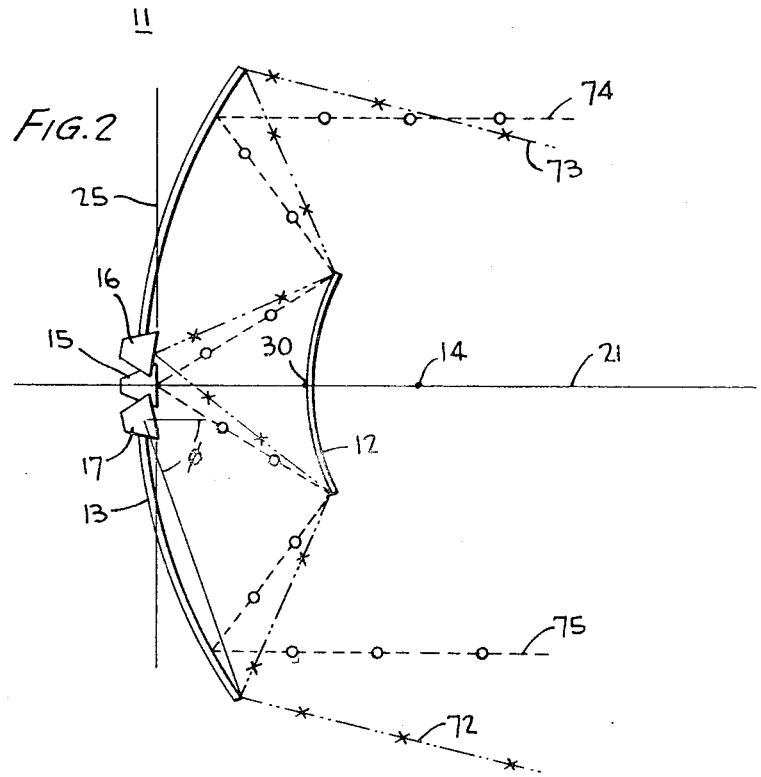
FIG. 2 is an elevation view of a preferred embodiment of the antenna feed and reflector system of the present invention.

Reference is now made to FIGS. 1 and 2 of the drawings wherein there is illustrated a Cassegrain reflector system 11 comprising hyperboloid subreflector 12 and paraboloid main reflector 13. As is conventional in the art, far focal point 14 of hyperboloid reflector 12 is coincident with the focal point of paraboloid reflector 13. At the near focal point of hyperboloid 12, in an aperture at the apex of paraboloid reflector 13, and hence at the intersection of the reflector system boresight axis 21 with its elevation and azimuth axes 24 and 25, is conical horn feed 15.

Figure 3:
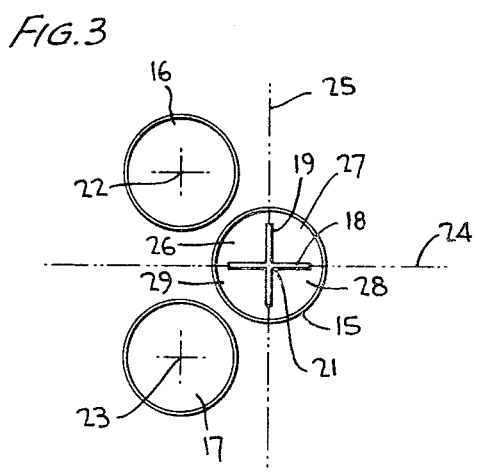
FIG. 3 is a front view of the feed elements of the present invention.

As seen in FIG. 3, feed horn 15 is divided by septums 18 and 19 into four separate and discrete sections 26-29 to enable monopulse difference patterns to be derived in both the azimuth and elevation planes. The relatively narrow beam difference patterns have nulls along boresight axis 21 whereby a target along the boresight axis results in equal excitation of each of sections 26-29. If a target is removed from boresight axis 21 by up to one beam width in either the elevation or azimuth planes the horn sections are differentially excited to enable a precise indication of target direction to be derived in accordance with well known monopulse techniques.

Because of the relatively narrow lobes resulting from in phase and differential excitation of sections 26-29, horn 15 is unable to detect the presence or acquire a target outside of a relatively narrow angular region. To increase the acquisition angle of reflector system 11 in the elevation plane, conical feed horns 16 and 17 are provided. Horns 16 and 17 have apertures of the same diameter, equal to the aperture of horn 15, and have the centers 22 and 23 thereof equally displaced above and below elevation axis 24 and to one side of azimuth axis 25. The equal diameter apertures of horns 15-17 cause the beams derived from auxiliary horns 16 and 17 to have substantially the same characteristics with regard to amplitude and directivity as horn 15 when segments 26-29 are in phase excited to derive a monopulse sum beam. Because the centers 22 and 23 of auxiliary horns 16 and 17 are offset from elevation axis 24, the longitudinal axes of the secondary radiation beams derived from reflector system 11 in response to excitation of the auxiliary horns are respectively above and below the elevation axis to increase the target acquisition angle of the system.

To enable relatively high crossover amplitudes between the secondary patterns derived in response to excitation of each of feed horns 15-17 to subsist in the elevation plane, there is an overlapping region, at right angles to elevation axis 24, between horns 15 and 16, and horns 15 and 17. The overlapping feature, in addition to providing high amplitude crossovers for the secondary pattern of horns 16 and 17 relative to horn 15, enables an optimum diameter to be selected for horns 15-17 without physical interference between them. The optimum diameter for horns 15-17 enables each of the horns efficiently to illuminate subreflector 12, whereby spillover energy of each of the feeds past the subreflector is minimized and the subreflector is uniformly illuminated over its entire area by each of the feeds.

As seen in FIG. 2, offset horns 16 and 17 are positioned so that the apertures thereof are directed toward apex 30 of subreflector 12. The pointing angles of horns 16 and 17 are such that the longitudinal axes of the primary radiation patterns of the horns intersect boresight axis 21 at a point between apex 30 and hyperboloid focus 14. The orientation of horns 16 and 17 minimizes the spillover energy of the offset horns past subreflector 12 and provides substantially uniform illumination to all areas of the subreflector. In an ideal situation, the densities of energy impinging on subreflector 12 at the upper and lower edges thereof, as viewed in FIG. 2 are the same and equal to the density at the apex of the subreflector and a step function variation exists between the energy of density impinging on the edges of subreflector 12 and the region immediately surrounding the subreflector. Of course, these ideal conditions cannot be practically realized but it has been found that they are approached with the present configuration.

Returning now to the description of FIG. 1, horn feeds 15-17 are driven in the transmission mode in response to pulses modulating three different C-band carrier frequencies, $F_1$, $F_2$ and $F_3$, derived by transmitter 31. The different carrier frequencies modulating pulses are derived by transmitter 31 at different times. With the system in the target acquisition mode, i.e., attempting to detect the presence of a target in the secondary patterns derived from Cassegrain antenna system 11, rather than the tracking mode wherein the difference patterns of sections 26-29 are utilized to detect exact target location, transmitter 31 is operated so that the three different frequencies are successively derived. Once a target has been acquired and is located in the secondary beam resulting from excitation of feed 15, transmitter 31 is operated so that it derives pulses modulated only at the carrier frequency $F_3$.

The three different carrier frequency pulses generated by transmitter 31 are fed to triplexer 32 which functions essentially as a frequency sensitive switch. Triplexer 32 separates the pulses of different carrier frequencies generated by transmitter 31 into three output channels 33, 34 and 35. Channels 33, 34 and 35 respectively feed pulses having carrier frequencies $F_1$, $F_2$ and $F_3$ to feed horns 16, 17 and 15. The pulses having carriers $F_1$ and $F_2$ are coupled to feeds 16 and 17 via duplexers 36 and 37, respectively, while feed 15 is driven in response to the output of channel 35 through duplexer 38 and monopulse matrix 39. Monopulse matrix 39 is of the conventional type, including four output ports, each of which is connected to a different one of the four sections 26-29 of the feed 15.

In the transmission mode monopulse matrix 39 drives the four sections 26-29 of feed 15 with in phase energy to derive the familiar monopulse sum pattern. Monopulse matrix 39 responds to energy reflected from a target that excites feed 15 to provide elevation and azimuth difference patterns and a sum pattern. In response to the energies in the patterns, direction indicating signals in the elevation and azimuth planes are derived. Signals which originate at a target excite feed 15 are coupled from monopulse matrix 39 through duplexer 38 to monopulse receiver 42, tuned to be responsive to frequency $F_3$ to the exclusion of frequencies $F_1$ and $F_2$.

The sum signal derived by monopulse receiver 42 is fed to control network 43, which is also responsive to the outputs of receivers 44 and 45. Receivers 44 and 45 are respectively tuned to frequencies $F_1$ and $F_2$ and responsive to the target signals exciting feeds 16 and 17, as coupled through duplexers 36 and 37. Control network 43 responds to the relative amplitudes of the inputs thereof to control the sequencing of the different carrier frequencies generated by transmitter 31. In response to the sum output of receiver 42 being of a greater amplitude than the output signals of receivers 44 and 45, control network 43 generates a signal whereby transmitter 31 derives pulses only at the $F_3$ carrier. Feed 15 is continuously driven by the $F_3$ carrier generated by transmitter 31, to the exclusion of feeds 16 and 17, whereby the system functions in the tracking mode and azimuth and elevation difference signals derived by monopulse receiver 42 indicate the exact location of a target being tracked relative to boresight axis 21. If, however, the amplitude of the signals derived by either of receivers 44 or 45 is equal to or greater than the sum output signal of monopulse receiver 42, control network 43 activates transmitter 31 so that the pulses of carriers $F_1$, $F_2$ and $F_3$ are generated in sequence.

Typically, the pulses generated by transmitter 31 have a peak power of 3.3 megawatts and a 6.6 kilowatt average power level and the carrier frequencies $F_1$, $F_2$ and $F_3$ are respectively 5.850 GHz, 5.700 GHz and 5.550 GHz. These high power, C-band pulses are fed to triplexer 32 which is particularly designed to be responsive to power levels of the magnitude specified. To this end, each wave guide element included in the three channels of triplexer 32 is pressurized with a suitable gas, such as $SF_6$ at 35 pounds per square inch pressure.

In general, triplexer 32 includes three cascaded channels, each of which derives a different output frequency in response to the carrier frequencies generated by transmitter 31. The first two channels of triplexer 32, those driving output channels 33 and 34, respectively pass the frequencies $F_1$ and $F_2$ and are essentially the same, while the triplexer channel driving output channel 35 merely comprises a wave guide section.

The channels of triplexer 32 driving output channels 33 and 34 comprise a pair of hybrids, between which are connected a pair of high pass filters in the form of wave guides with suitable low-frequency cutoffs. Considering the first triplexer channel, i.e., the triplexer channel driving output channel 33, four-port hybrids 51 and 52 are provided. Between hybrids 51 and 52 are connected high pass filters 53 and 54, each having a cutoff frequency below the $F_1$ carrier frequency of the pulses derived by transmitter 31, viz: 5,850 GHz. The cutoff frequency of each of filters 53 and 54 is approximately 5.800 GHz so that the other frequencies ($F_2$ and $F_3$) derived by transmitter 31 are rejected by the filters. Connecting each of high pass filters 53 and 54 with the ports of hybrids 51 and 52 are wave guide sections 55–58, having a symmetrical cosine taper to provide a low voltage standing wave ratio between the filters and hybrids and enable the high power pulses derived by transmitter 31 to be coupled efficiently between the hybrids and high pass filters.

Hybrids 51 and 52, which respectively include ports 61–64 and 66–69, are of the well known type whereby energy entering port 61 from transmitter 31 is coupled to ports 62 and 63 and decoupled from port 64. The energies coupled to ports 62 and 63 are respectively zero and 90° phased displaced from the energy fed to port 61. The energy levels coupled through each of ports 62 and 63 are approximately 3 db. less than the energy fed to port 61.

The second triplexer channel, feeding output channel 34, is essentially the same as the first triplexer channel, except that the cutoff frequency of the high pass filters in the second channel is below the $F_2$ excitation frequency for horn 17, being approximately 5.650 GHz. The second channel is driven in response to energy reflected from the first channel, while the first channel is directly responsive to the output of transmitter 31. In each of the channels, one of the ports of the hybrid responsive to energy coupled to the high pass filters is connected to a matching impedance. For example, output port 69 of hybrid 52 is connected to matching resistor 65.

To consider the operation of triplexer 32, assume that transmitter 31 is generating a pulse having a carrier frequency $F_1$. The $F_1$ carrier enters hybrid 51 at port 61 and is respectively coupled to ports 62 and 63 with zero and 90° phase displacements and a 3 db. attenuation. The energies at ports 62 and 63 are coupled through high pass filters 53 and 54 in substantially unaltered form to drive ports 66 and 67 of hybrid 52. Energy entering port 66 is coupled to ports 68 and 69 with additional phase shifts of 90° and 0°, respectively. Hence, energy passing through high pass filter 53 and coupled to output port 68 suffers a total 90° phase shift, while energy coupled through high pass filter 53 to port 69 undergoes a 0° phase shift. In contrast, energy coupled through a high pass filter 54 is fed to port 69 of hybrid 52 at a phase 180° relative to the energy at port 61; energy at port 68 fed through filter 54 undergoes a 90° phase shift. Because the energies coupled to ports 68 and 69 are propagated through paths having the same impedance and loss characteristics, the voltage amplitudes due to each contribution at ports 68 and 69 are equal. Thereby, equal voltages having a 180° phase relationship, are coupled to port 69 through the arms of hybrid 52 in response to energy coupled to the hybrid port 66 and 67.

Because the voltages coupled to port 69 are of equal amplitude and 180° displaced from each other, there is a cancellation effect at port 69 of the $F_1$ energy and virtually zero dissipation in load impedance 65. In contrast, the energies coupled to port 68 have the same phase and are thereby additive. Hence, the energy at frequency $F_1$ coupled to port 68 is 90 degrees phase displaced and has substantially the same energy level relative to the energy at port 61.

Because all of the energy at frequency $F_1$ was coupled through filters 53 and 54, there is no reflected energy from the filters back to ports 62 and 63 of hybrid 51. Thereby, no energy is coupled to port 64 of hybrid 51 at frequency $F_1$ and the remaining output channels 34 and 35 are unresponsive to pulses of the $F_1$ carrier frequencies.

Next consider that transmitter 31 generates a pulse having a carrier frequency of $F_2$. The $F_2$ carrier is fed to port 61 of hybrid 51 and coupled through the hybrid in exactly the same manner as the $F_1$ carrier. The $F_2$ carrier, however, is reflected with substantially zero db. attenuation and zero degree phase shift by high pass filters 53 and 54 so that it is coupled back to ports 62 and 63 of hybrid 51. The energy reflected back to port 63 from high pass filter 54 is coupled to port 61 with a further 90° phase shift while the energy coupled back to port 62 by filter 53 is fed to hybrid port 61 with a zero degree phase shift. Substantially equal attenuation of the energies coupled by ports 62 and 63 to inlet port 61 occurs, whereby there is a cancellation at port 61 of the $F_2$ energy reflected from filters 53 and 54. In contrast, the $F_2$ energy reflected from filters 53 and 54. In contrast, the $F_2$ carrier fed through hybrid 51 is coupled to port 64 from ports 62 and 63 with a 90° phase shift in each path relative to the phase of the $F_2$ carrier fed to port 61 by transmitter 31. Since the $F_2$ carrier fed by transmitter 31 to hybrid 51 is coupled only to port 64, to the exclusion of the other ports 61–63, and the hybrid is virtually lossless, the $F_2$ energy at port 64 is at substantially the same energy level as the $F_2$ energy generated by transmitter 31.

The second channel responds to the $F_2$ carrier derived from port 64 in exactly the same manner as the first channel responds to the $F_1$ energy. Thereby, the energy at carrier $F_2$ delivered to output channel 34 is 180° phase displaced from the energy at carrier frequency $F_2$ generated by transmitter 31 and is at substantially the same power level.

In response to transmitter 31 generating a carrier at frequency $F_3$, the first and second channels function in the manner indicated supra, with regard to the first channel rejecting the $F_2$ carrier. Thereby, the $F_3$ carrier is fed to output channel 35 with a phase displaced by 180° relative to the $F_3$ energy generated by transmitter 31 and at approximately the same power level.

Again, considering the operation of the feeds in response to the successive derivation of the frequencies $F_1$, $F_2$ and $F_3$, initially assume that the frequency $F_1$ is generated by transmitter 31. The $F_1$ carrier pulse is transmitted through duplexer 36 to excite horn 16. In response to the $F_1$ frequency exciting horn 16, ray paths indicated by the dashed line having X's superimposed thereon, FIG. 2, are derived. The ray path between feed horn 16 and the lower edge of subreflector 12 causes the lower edge of main reflector 13 to be illuminated to derive the secondary radiation ray path indicated by line 72. In contrast, excitation of the upper edge of subreflector 12 illuminates the upper edge of main reflector 13, causing secondary radiation ray 73 to be derived. RAys 72 and 73 are parallel to each other but are directed at an elevation angle below boresight axis 21 by an angle determined by the displacement of the center of horn 16 above elevation axis 24.

Excitation of horn 17 in response to the frequency $F_2$ results in the derivation of ray paths substantially identical and of equal intensity to ray paths 72 and 73 but in a direction above boresight axis 21 in the elevation plane. Because of the similar nature of the ray paths resulting from excitation of feed 17 to the ray paths illustrated for feed 16, there is no need to show these ray paths explicitly on FIG. 2, in order to simplify the drawing.

Figure 4:
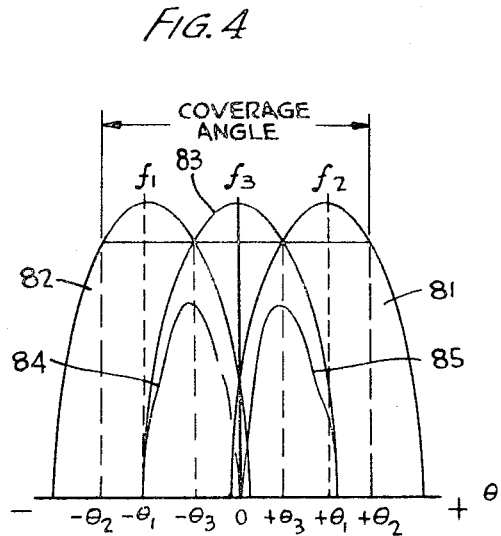
FIG. 4 is a plot of the composite pattern of the feed and antenna system of FIGS. 2 and 3, as a function of amplitude versus boresight axis angle displacement.

A plot of the amplitude of the secondary excitation pattern resulting from feed 17 being energized is shown in FIG. 4 by lobe 81. In FIG. 4, pattern amplitude is plotted against elevation angle, wherein the elevation angle, $\theta=0$, corresponds with elevation axis 24, and positive and negative angles are respectively above and below the elevation axis. Lobe 81 has a maximum at an elevation angle $\theta_1$ degrees above elevation axis 24. Lobe 81 has a relatively large amplitude until it reaches a minimum gain point at the angle $+\theta_2$. For elevation angles greater than $+\theta_2$ relative to elevation axis 24, there is insufficient energy in lobe 81 to enable a target to be acquired with a high degree of reliability. Thereby, the angle $+\theta_2$ is the maximum coverage angle for lobe 81. The minimum angle for which lobe 81 can be utilized for target acquisition purposes is that point on the lobe where the lobe amplitude equals the amplitude at $\theta_2$, designated by the angle $+\theta_3$. The angles $+\theta_2$ and $+\theta_3$ are displaced equally, but on opposite sides, of $\theta_1$ because of the essentially symmetrical nature of the reflector system illumination by horn 17.

Excitation of feed 16 produces a lobe 82 having the same maximum amplitude as lobe 81 at an angle $\theta_1$ degrees below elevation axis 24. Lobe 82, being substantially the mirror image of lobe 81, is able to detect targets through the angular range of $-\theta_2$ to $-\theta_3$. In other words, the maximum and minimum angles of the excitation patterns resulting from energization of feed 16 for enabling a target to be acquired are equal and opposite to the corresponding angles for excitation of horn 17.

Energization of horn 15 in response to the carrier frequency $F_3$ causes the ray paths of FIG. 2 indicated by the dashed lines having circles superimposed thereon to be derived. In particular, secondary ray paths 74 and 75, equally spaced from and parallel to boresight axis 21 in the elevation plane, are derived in response to illumination of the edges of subreflector 12 by energy derived from horn 15.

In FIG. 2, the separation of rays 74 and 75 relative to the spacing between rays 72 and 73 is much greater than would be encountered in a practical system, in which the beam widths of the two patterns are substantially the same. The beam widths are shown differently in FIG. 2 because of the close spacing between the feeds and reflectors and to facilitate the presentation.

As indicated by lobe 83, FIG. 4, a plot of the energy of the secondary radiation beam derived by in phase exciting sections 26–29 of horn 15, the monopulse sum beam is symmetrical about the boresight and elevation axes 21 and 24. It is noted from FIG. 4 that lobe 83 has crossover points with lobes 81 and 82 at an amplitude equal to the amplitudes of lobes 81 and 82 at angles $\pm\theta_2$. Hence, throughout the elevation angle range between $\pm\theta_2$, which is generally on the order of three beam widths, there is sufficient energy in the composite pattern comprising lobes 81–83 to enable a target to be detected and thereby acquired. In other words, no nulls, which would prevent acquisition, in the composite pattern comprised of lobes 81–83 occur throughout the angle range between $+\theta_2$ and $-\theta_2$.

The wide angular coverage attained through the use of feeds 15–17 is to be compared with the narrow coverage resulting from differential excitation of the elevation sections of horn 15 in accordance with conventional monopulse techniques, as shown by lobes difference signed 84 and 85. Lobes 84 and 85 have a null at $\theta=0°$ and maximum values at approximately $\pm\theta_3$. It is noted that the maximum amplitudes of lobes 84 and 85 at the angles $\pm\theta_3$ occur at angles less than $\pm\theta_1$, where lobes 81 and 82 are a maximum. Thereby, the elevation angle through which the monopulse tracking lobes are effective is considerably less than the target acquisition angles employing the three independent feeds 15–17.

While there has been described and illustrated one specific embodiment of the invention, it will be clear that variations in the details of the embodiment specifically illustrated and described may be made without departing from the true spirit and scope of the invention as defined in the appended claims.

We claim:

1. A target acquisition system adaptable for acquiring a target over an elevation angle range of $2\theta$, comprising a reflector system for deriving a secondary pattern, said reflector system having boresight, azimuth and elevation axes and a focal point, a central feed having the radiation center thereof positioned substantially at said focal point, and a plurality of auxiliary feeds having the radiation centers thereof displaced from each of said axes, the centers of a pair of said auxiliary feeds being equally displaced above and below the elevation axis, means for exciting each of said feeds to illuminate said reflector system to derive secondary patterns having main lobes of substantially equal maximum amplitudes, shapes and beam widths, said beam widths being less than $2\theta$, the maximum amplitude of the main lobe associated with the central feed being substantially aligned with the boresight axis, the apertures of said feeds and the relative spacings of the centers thereof in the direction of the azimuth axis being such that the amplitude at the crossover points between the lobes associated with the auxiliary feeds and the central feed is approximately equal to the amplitudes of the lobes associated with the auxiliary feeds at the angle $2\theta$, wherein said exciting means includes means for exciting each of said feeds with a different frequency.

2. The antenna of claim 1 wherein each of said feeds has substantially the same aperture area and shape, the length of the radiating aperture of said central feed along the azimuth axis from the boresight axis being greater than the separation of the closest edges of the auxiliary feeds from the elevation axis.

3. The antenna of claim 1 wherein said exciting means includes means for exciting each of said feeds with a different frequency energy at a different time.

4. The antenna of claim 3 wherein each of said feeds has substantially the same aperture area and shape, the length of the radiating aperture of said central feed along the azimuth axis from the boresight axis being greater than the separation of the closest edges of the auxiliary feeds from the elevation axis.

5. The system of claim 1 wherein said reflector system is a Cassegrain reflector system including a hyperboloid subreflector having first and second foci and a paraboloid main reflector having a focal point coincident with the first of said foci, said secondary reflector having an apex along said boresight axis and between said foci, said central feed being positioned at a point coincident with the second of said foci, each of said auxiliary feeds deriving a primary pattern having a longitudinal axis to intersect the boresight axis at a point between the apex and first of said foci.

6. The antenna of claim 5 wherein each of said feeds has substantially the same aperture area and shape, the length of the radiating aperture of said central feed along the azimuth axis from the boresight axis being greater than the separation of the closest edges of the auxiliary feeds from the elevation axis.

7. A target tracking and acquisition system adaptable for acquiring a target over an elevation angle range of $2\theta$, comprising a reflector system for deriving a secondary pattern, said reflector system having boresight, azimuth and elevation axes and a focal point, a monopulse feed having the radiation center thereof positioned substantially at said focal point, and a plurality of auxiliary feeds having their radiation centers displaced from each of said axes, the centers of a pair of said auxiliary feeds being equally displaced above and below the elevation axis, means for exciting each of said feeds to illuminate said reflector system to derive secondary patterns having main lobes of substantially equal maximum amplitudes, shapes and beam widths, said beam widths being less than $2\theta$, the maximum amplitude of the main lobe associated with the monopulse feed being substantially aligned with the boresight axis, the apertures of said feeds and the relative spacings of the centers thereof in the direction of the azimuth axis being such that the amplitude at the crossover points between the lobes associated with the auxiliary feeds and the monopulse feed is approximately equal to the amplitudes of the lobes associated with the auxiliary feeds at the angle $2\theta$, wherein the said exciting means includes means for exciting each of said feeds with a different frequency.

8. In a monopulse system for tracking a target employing a cassegrain reflector system including a hyperboloid subreflector having first and second foci and a paraboloid main reflector having a focal point coincident with said first of said foci, a monopulse feed being positioned at a point coincident with said second of said foci, each of said foci lying on the reflector system boresight axis, the improvement comprising:
   means for providing increased reflector system beamwidth for enabling said monopulse system to accomplish target acquisition without reducing effective antenna diameter, said means including
   a. a plurality of auxiliary feeds having their radiation centers slightly displaced in a predetermined manner from said reflector system boresight axis, and
   b. means for sequentially exciting each of said feeds with a different frequency.

* * * * *